United States Patent [19]

Sailas

[11] 4,104,773
[45] Aug. 8, 1978

[54] ROLL MANUFACTURING METHOD AND ROLL, PARTICULARLY FOR PAPER MACHINES

[75] Inventor: Väinö Sailas, Vaajakoski, Finland

[73] Assignee: Valmet Oy, Helsinki, Finland

[21] Appl. No.: 802,316

[22] Filed: Jun. 1, 1977

[30] Foreign Application Priority Data

Jun. 4, 1976 [FI] Finland .................................. 761602

[51] Int. Cl.² ............................................. B30B 3/00
[52] U.S. Cl. ..................................................... 29/127
[58] Field of Search ...................... 29/127, 121.4, 125, 29/130

[56] References Cited

U.S. PATENT DOCUMENTS

| | | | |
|---|---|---|---|
| 1,100,090 | 6/1914 | Parker | 29/127 |
| 1,795,556 | 3/1931 | Greis | 29/127 |
| 2,807,124 | 9/1957 | Tachon | 29/127 X |
| 3,054,163 | 9/1962 | Lakin | 29/121.4 X |
| 3,981,059 | 9/1976 | Dodson | 29/127 |

FOREIGN PATENT DOCUMENTS 2,545,146  4/1976  Fed. Rep. of Germany .......... 29/121.4

*Primary Examiner*—Alfred R. Guest
*Attorney, Agent, or Firm*—Steinberg & Blake

[57] ABSTRACT

A roll manufacturing method and roll, particularly for paper machines, wherein an inner roll body is surrounded by a strip having circumferential portions such as windings which engage and extend outwardly from an exterior surface of the inner roll body with the successive windings or circumferential strip portions engaging each other so that the engaging side surfaces of successive strip turns define an interface between themselves. The side surfaces of the strip are formed with registering grooves which thus define a bore extending across the interface, and an elongated interlocking member is situated in the latter bore so as to interlock the successive turns or circumferential strip portions against radial displacement outwardly away from the inner roll body. The interlocking member preferably has a fluid-tight sealing engagement with the groove surfaces which define the bore which receives the interlocking member, so that the interlocking member also forms a moisture barrier.

8 Claims, 10 Drawing Figures

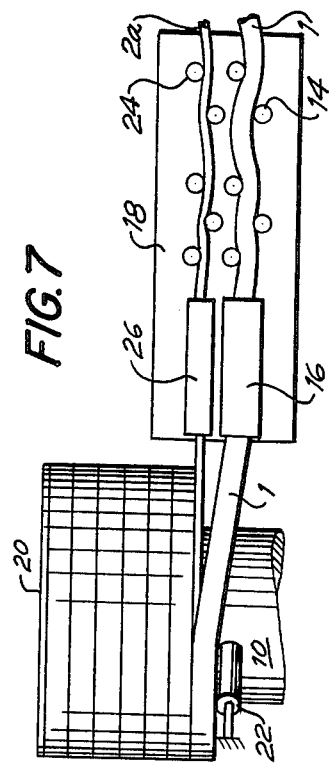
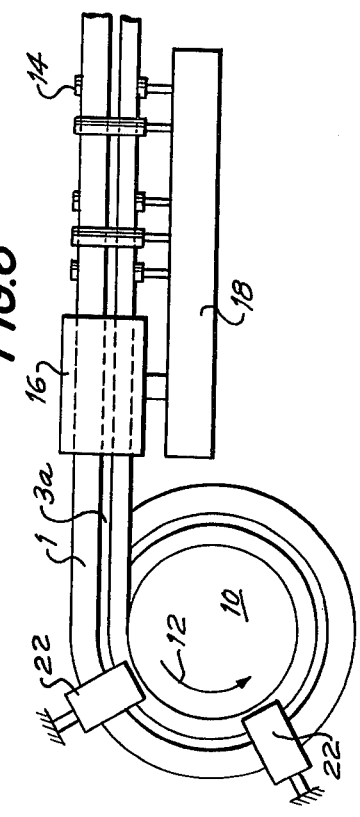
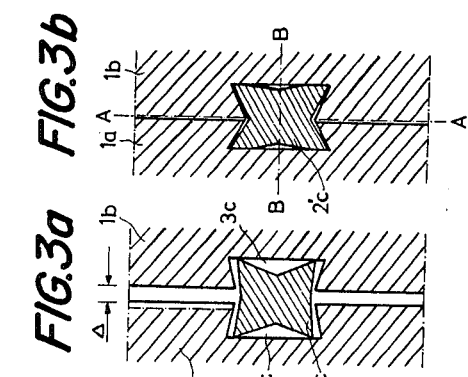
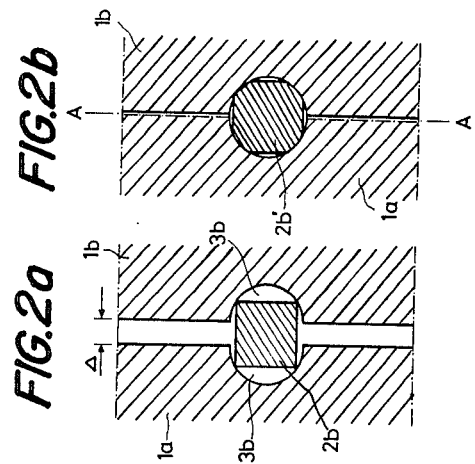
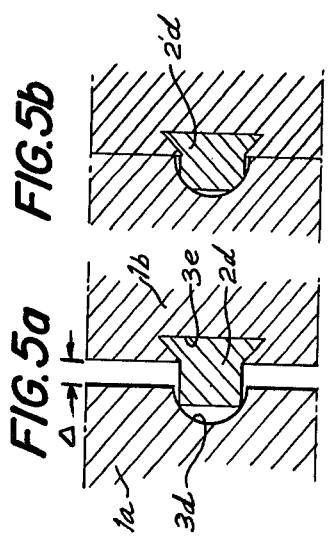
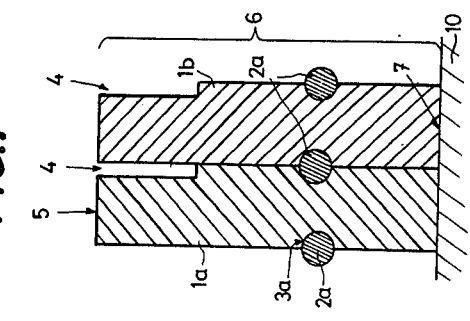
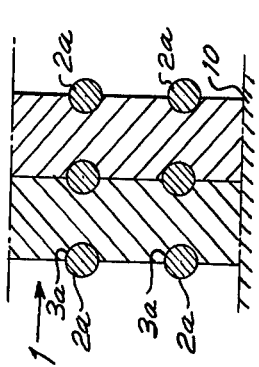

ROLL MANUFACTURING METHOD AND ROLL, PARTICULARLY FOR PAPER MACHINES

BACKGROUND OF THE INVENTION

The present invention relates to rolls of the type which are used in paper machines as well as to methods for manufacturing such rolls.

The present invention relates in particular to that type of roll which has an inner roll body which may be solid or in the form of a hollow sleeve and which is covered at its exterior surface by an elongated covering strip which may be helically wound onto the inner roll body with successive turns of the strip engaging the exterior surface of the roll body and pressing against each other. The strip may be formed at the region of its outer edge surface which is directed away from the inner roll body with one or more shoulders which thus provide for the covering strip grooves at the exterior surface of the finished roll, or the side surfaces of the strip can directly engage each other at the outer edge surface of the strip so as to provide the roll with a smooth exterior surface, or any desired combination of smooth and grooved exterior surfaces may be provided for the roll.

Thus, with such a construction the strip has circumferential portions situated one next to the other and surrounding the inner roll body, these circumferential portions forming, for example, successive turns of a helically wound strip. One of the problems encountered with a construction of this type is in connection with the interlocking of the successive turns or circumferential strip portions in such a way that they will not become displaced radially away from the inner roll body. A strip of the latter type is generally made of a corrosion-resistant material, and it is important to prevent moisture from having access to the exterior surface of the inner roll body. Problems are also encountered in known constructions of the above type in connection with preventing moisture from having access to the inner roll body so as to prevent corrosion thereof.

Also, in connection with constructions of the above type it is important to prevent the successive turns of the strip from becoming displaced axially apart from each other. Furthermore, one of the problems encountered in the prior art is in connection with constructing the strip with the degree of precision required in maintaining the successive turns of the strip reliably in engagement with each other at all times.

Thus, the invention relates to a roll of the type which is adapted to be used in a paper machine and which is provided with a roll covering which preferably is of a corrosion-resistant material and which may be either grooved or ungrooved over its exterior surface, or which is made up of grooved and ungrooved portions situated one next to the other along the axis of the roll.

Paper machine roll coverings made of a continuous covering strip by winding such a strip on an inner roll body are already known. For example reference in this connection may be made to U.S. Pat. No. 3,718,959.

SUMMARY OF THE INVENTION

It is accordingly a primary object of the present invention to provide a roll manufacturing method and a roll resulting therefrom which will avoid the above drawbacks.

Thus, it is an object of the present invention to provide a roll and roll manufacturing method according to which it is possible to secure to an inner roll body an elongated covering strip in a manner which is easy to manufacture while nevertheless affording a positive and reliable securing or interlocking of the successive turns of the strip with respect to each other and with respect to the inner roll body.

It is also an object of the present invention to provide a securing or interlocking of the successive strip turns in such a way that these successive strip turns will be situated directly next to each other in a manner according to which they are pressed tightly against each other.

It is furthermore an object of the present invention to provide a method and structure of the above type according to which the interlocking of the successive circumferential strip portions also serves to provide a fluid-tight seal and barrier against corrosion.

In addition it is an object of the present invention to provide a method and structure of the above type according to which it becomes unnecessary to manufacture components with a high degree of precision.

According to the invention the interlocking is carried out by providing the opposed side surfaces of the strip with grooves which register with each other at the interface between engaging side surfaces of successive strip turns so as to form in this way from the registering grooves an elongated bore circumferentially surrounding the inner roll body. An elongated interlocking member is situated in the latter bore, this elongated interlocking member preferably being situated in the latter bore simultaneously with the winding of the strip onto the inner roll body.

BRIEF DESCRIPTION OF DRAWINGS

The invention is illustrated by way of example in the accompanying drawings which form part of this application and in which:

FIG. 1 is a fragmentary schematic sectional elevation of part of a roll of the invention, the section of FIG. 1 taken in a plane which contains the roll axis;

FIG. 2a fragmentarily and schematically illustrates in a section which contains the roll axis part of a roll structure at a stage prior to the finished roll structure;

FIG. 2b shows the structure of FIG. 2a in the completed roll structure;

FIG. 3a shows another embodiment of the method and structure of the invention at a stage prior to the finished structure;

FIG. 3b shows the construction of FIG. 3a after the roll structure has been completed;

FIG. 4 is a fragmentary schematic sectional illustration of a further embodiment of a method and structure of the invention, the section of FIG. 4 also being taken in a plane which contains the roll axis;

FIG. 5a schematically and fragmentarily illustrates in a section containing the roll axis a further embodiment of a method and structure of the invention as shown in FIG. 5a at a stage prior to completion thereof;

FIG. 5b shows the construction of FIG. 5a when the roll structure has been completed;

FIG. 6 is a schematic elevation, in a plane normal to the roll axis, illustrating one possible method of the invention; and FIG. 7 is a schematic top plan view of the structure of FIG. 6, further illustrating one possible method of the invention for manufacturing a roll of the invention.

DESCRIPTION OF PREFERRED EMBODIMENTS

Referring first to FIG. 1 there is fragmentarily illustrated therein in a sectional manner part of an inner roll body 10 which may be a solid roll body or which may be in the form of a hollow cylindrical sleeve. This inner roll body 10 is covered with an elongated strip 1, made, for example, of stainless steel and helically wound onto the roll body 10 so that the strip 1 has a plurality of successive turns surrounding the roll body 10. A pair of such turns 1a and 1b are illustrated fragmentarily in FIG. 1. In the example of FIG. 1 the strip 1 has been formed at an outer edge surface region 5 thereof with a shoulder extending longitudinally along the strip so that the successive turns define for the roll covering a groove 4 which helically surrounds the inner roll body 10 in the manner apparent from FIG. 1. However, it is to be understood that the invention is also applicable in connection with an ungrooved roll covering, in which case the strip has a uniform thickness throughout so that there will be no grooves at the exterior of the roll covering. Thus, in this case the roll covering 6 will have a smooth surface. FIG. 1 illustrates how the inner edge surface 7 of the strip 1 directly engages the exterior surface of the inner roll body 10.

As is apparent from FIG. 1, the elongated strip 1 is formed at its opposed side surfaces with a pair of grooves 3a which extend longitudinally along the strip initially parallel to the opposed edge surfaces thereof, so that the grooves 3a are respectively situated at equal distances from the inner edge surface 7 of the strip 1. As a result, when the strip is wound onto the roll body 10 and the successive turns of the strip are pressed against each other, the grooves 3a at adjoining side surfaces of successive turns come in to register with each other so as to form in this way an elongated bore circumferentially surrounding and spaced from the roll body 10 at the adjoining surfaces of each pair of successive turns of the strip 1. Situated within this elongated bore formed by the registering grooves 3a is an elongated interlocking member 2a. This interlocking member 2a in the example of FIG. 1 has the same cross section as the bore which is formed by the registering grooves. In the illustrated example this cross section is circular inasmuch as each groove 3a is of a semicircular cross section. The elongated interlocking member 2a may be made of a material such as lead or a plastic and is longitudinally fed into the grooves 3a as they come together to register each other and define the circumferential bore at each pair of successive turns of the strip 1. Thus, because the interlocking member 2a extends across the interface between successive strip turns and fills the bore defined by the grooves 3a, this interlocking member 2a will interlock the strip turns in a manner preventing their radial displacement one with respect to the other outwardly away from the roll body 10. In addition, the exterior surface of the interlocking member 2a presses against the surfaces which define the grooves 3a so as to achieve in this way a fluid-tight seal and a barrier which will not permit moisture or water to pass across the location of the interlocking member 2a. Thus, in this way the structure of the invention will constitute a barrier against corrosion.

In the embodiment of the invention which is illustrated in FIGS. 2a and 2b, the successive strip portions 1a and 1b are substantially identical with those of FIG. 1 and are respectively formed with the grooves 3b which are also substantially identical with the grooves 3a. However, in this embodiment the elongated interlocking member 2b is initially of the square cross section illustrated in FIG. 2a. The size of the cross section of the interlocking member 2b is such that initially, while the interlocking member 2b retains its original cross-sectional configuration, the successive turns 1a and 1b of the strip cannot come into engagement with each other and instead are maintained at the distance Δ apart from each other. However, during winding of the strip 1 onto the inner roll body 10, the successive turns thereof are pressed against each other. The interlocking member is made of lead or a deformable plastic such as polyvinyl chloride, polybutadiene, or polyurethane or the like, with the result that the harder material of the strip causes the interlocking member to become deformed when the adjoining side surfaces of successive turns of the strip are pressed into engagement with each other. Thus, the pressing of the turns of the strip into engagement with each other serves to work and deform the interlocking member 2b so that it assumes in the example of FIGS. 2a and 2b the configuration 2b' shown in FIG. 2b. Thus, when the grooves 3b, come into registry with each other so as to define a continuous bore this bore will be substantially filled by the deformed interlocking member 2b'.

With this embodiment of FIGS. 2a and 2b, there is thus an assurance that there will be well-sealed interfaces formed between the interlocking member 2b' and the surfaces which define the grooves 3b. In addition, it will be seen that the interlocking member will not provide any excessive binding even if the shape and depth of the grooves 3b are not of a precise size and configuration. Thus with this particular embodiment there is no requirement of an extremely high degree of accuracy with respect to the dimensions and configuration of the grooves 3b, so that in this respect the embodiment of FIGS. 2a and 2b is superior to that of FIG. 1.

Referring now to FIGS. 3a and 3b, it will be seen that according to this embodiment of the invention the strip 1 is formed at its opposed side surfaces with elongated grooves 3c which are of a dovetail cross section. Thus, at the side surface where the grooves 3c is situated this groove has a lesser width than inwardly from this side surface. The elongated interlocking member 2c, which in the same way as the elongated interlocking member 2b may be made of lead or any deformable plastic such as those referred to above, is initially of the substantially star-shaped cross section apparent from FIG. 3a. Thus, initially the deformable strip 2c has its opposed side surfaces formed with the substantially V-shaped shallow grooves apparent from FIG. 3a, the elongated interlocking member 2c initially having its outer side edges at the outer sides of these grooves situated apart from each other by a distance small enough to enable the elongated interlocking member 2c to enter freely into the grooves 3c in the manner apparent from FIG. 3a. At this time the size of the cross section of the interlocking member 2c is such that the successive turns 1a, 1b, will be spaced from each other by the distance Δ apparent from FIG. 3a.

Subsequently, however, when the turns of the strip 1 are pressed against each other so that the turns 1a, 1b assume the position with respect to each other shown in FIG. 3b, the interlocking member 2c will be deformed to have the configuration of the interlocking member 2'c apparent from FIG. 3b. The result of the movement of the turn 1b into pressing engagement with the turn 1a is that the opposed side edges of the interlocking member 2c at each side thereof are spread apart from each other to become spaced from each other by a distance greater than the minimum width of each groove 3c at the side surface of the strip 1, so that in this way there will be provided, as shown in FIG. 3b, an interlocking not only in a radial direction but also in an axial direction. Thus, with this construction the successive turns 1a, 1b, etc., of the strip 1 will be interlocked not only in the radial direction A—A shown in FIG. 3b, but also in the axial direction B—B shown in FIG. 3b. Thus, with this embodiment the successive turns of the strip 1 are interlocked so that they will not become displaced from each other either radially or axially.

Several embodiments differing from those described above are also included within the invention. For example, as shown in FIG. 4, it is possible to provide for the strip 1, at each of its opposed side surfaces, two or even more grooves 3a, thus providing around the inner roll body 10 a plurality of circumferential bores, resulting from the registering grooves 3a, with these bores including inner bores surrounded by outer bores, as illustrated in FIG. 4. Thus in this case a plurality of elongated interlocking members 2a will be provided as shown in FIG. 4. The several interlocking members 2a are thus radially spaced from each other. Moreover, they need not be identical. It is possible of course to use different interlocking members of different configurations as well as different grooves of different configurations. Furthermore, the elongated interlocking member need not be continuous. It may be made up of several sections.

Moreover, while in all of the above described embodiments the interlocking member is of a symmetrical cross section, with respect to the radial plane A—A, such a construction also is not essential. Thus, the grooves respectively situated at the opposed side surfaces of the strip 1 may have different cross sections and the interlocking member may be of an asymmetric cross section.

Such a construction is shown in FIGS. 5a and 5b. Thus, in this case the strip 1 is formed in one side surface with a groove 3d which is of a substantially semicircular configuration in the same way as the grooves 3a or 3b. However, at its opposed side surface the strip 1 is formed with a groove 3e which is of a dovetail cross section similar to the grooves 3c.

The elongated interlocking member 2d of FIG. 5a has at its right, as viewed in FIG. 5a, an elongated portion of a dovetail configuration matching that of the groove 3e. This elongated interlocking member 2d is initially situated in the groove 3e, as illustrated in FIG. 5a, and an elongated portion of substantially square cross section projects beyond the groove 3e to be received in the groove 3d in the manner apparent from FIG. 5a. Thus at the stage of manufacture shown in FIG. 5a the successive turns 1a and 1b of the strip are spaced from each other by the distance Δ indicated in FIG. 5a. This elongated interlocking member 2d is made of the same deformable material as the interlocking members 2b or 2c. Thus, when the successive turns are pressed against the preceding turns, the projecting portion of the elongated member 2d which is of substantially square cross section initially becomes deformed in the groove 3d so as to provide in this way the construction shown in FIG. 5b where the elongated interlocking member 2'd is provided with the sealed arrangement as well as with the interlocking arrangement referred to above. Thus not only is it not essential to provide a symmetrical construction for the interlocking member and for the grooves, but in addition it is possible to situate the interlocking member initially in one of the grooves so that it need only be displaced into the other of the grooves as is apparent from FIGS. 5a and 5b.

Referring to FIGS. 6 and 7, the elongated cylindrical inner roll body 10 is mounted, for example, in a suitable lathe so as to be driven in rotation about its axis in the direction of the arrow 12 indicated in FIG. 6. The elongated strip 1 is derived from any suitable source and passes through straightening rollers 14 and a braking device 16 schematically indicated in FIGS. 6 and 7. The straightening rollers 14 and braking device 16 are carried by a carriage 18 of the lathe, this carriage 18 of course being fed in a direction parallel to the axis of the roll body 10 while the strip 1 is wound onto the roll body in a manner apparent from FIGS. 6 and 7. The free end of the strip 1 is initially fixed as by welding to a ring 20 (FIG. 7) fixed to one end of the roll body 10. Thus as the latter turns in the direction of the arrow 12 the strip 1 will be pulled through the straightening rollers 14 and the braking device 16 which will maintain a suitable tension on the strip 1. The braking device 16 is adjustable in a well known manner so as to control at the braking device 16 the frictional resistance to advance of the strip 1 so as to maintain a desired tension in the latter. As the strip 1 is wound onto the roll body 10, the end convolution of the strip 1 is engaged by one or more pressing rollers 22 which are freely turnable about axes which extend radially with respect to the axis of the roll body 10 and which are maintained through suitable hydraulic pressure devices or the like in pressing engagement with the end convolution, urging the latter at all times against the previously wound turn of the strip 1. Thus, in this manner the roll body 10 will be covered with the strip 1, and at the end of the operation the strip 1 is cut so as to leave a free end thereof which may also be fixed to a ring such as a ring 20 at the opposite end of the roll body 10.

As is shown most clearly in FIG. 7, simultaneously with the feeding of the strip 1 to the roll body 10, the elongated interlocking member 2a is fed from any suitable source to the roll body 10, this member 2a also passing through an additional set of straightening rollers 24 and an additional braking device 26 which serve to straighten the elongated interlocking member 2a and maintain a suitable tension therein, respectively, in the manner most clearly apparent from FIG. 7. As the member 2a thus travels beyond the braking device 26 as a result of the tension therein resulting from the turning of the roll body 10, this elongated interlocking member 2a enters into the space between the end convolution and the immediately preceding turn of the strip 1, so that in this way the elongated interlocking member 2a becomes automatically fed into the pair of grooves 3a which come into registry with each other to define the bore in which the elongated interlocking member 2a is situated. Of course, the free end of the elongated interlocking member 2a may be initially fixed to the free end of the strip 1 which is fixed to the member 20. Thus, in this way in one continuous operation the strip 1 is wound onto the roll body 10 to form a covering 6 for the latter while at the same time simultaneously with this operation the interlocking member 2a is fed into the grooves 3a as they come together into register to form the bore in which the interlocking member 2a is housed. Naturally, while the structure and method of FIGS. 6 and 7 have been described in connection with FIG. 1, the same structure and method may be utilized in connection with the other embodiments of the invention.

The material of the strip 2 is selected so as to be appropriate in view of its particular purpose. Thus, the strip 2 may be made, for example, of lead or of a suitable plastic material, as referred to above. The use of a relatively soft material, with respect to the hard material of the strip 1, which is made of stainless steel, for example, is highly favorable inasmuch as the comparatively soft material of the elongated interlocking member is enabled to easily be deformed so as to fit closely into the grooves while at the same time the resulting joint will not bind because of the use of a relatively soft material for the interlocking member, and such binding will not occur even if the grooves should be somewhat inaccurate with respect to their shape and dimensions.

With respect to the claims which follow, of course various details of the invention may vary within the scope of the inventive concept defined by the claims.

I claim:

1. In a roll of the type which is adapted to be used in a paper machine, an inner roll body of cylindrical configuration having an elongated central axis and an exterior cylindrical surface, and an elongated strip having successive portions circumferentially surrounding said inner roll body and engaging said exterior surface thereof with said circumferential portions of said strip having opposed side surfaces arranged with the side surface of one circumferential portion of said strip engaging the side surface of the next circumferential portion of said strip, said engaging side surfaces of successive circumferential portions of said strip respectively being formed with registering grooves which cooperate to define an elongated bore circumferentially surrounding said inner roll body and spaced therefrom, and an elongated interlocking member situated in said bore.

2. The combination of claim 1 and wherein said interlocking member fills said bore and is of substantially the same cross section as said bore.

3. The combination of claim 1 and wherein said interlocking member substantially fills said bore and has a fluid-tight sealing engagement with the groove surfaces which define said bore.

4. The combination of claim 1 and wherein the cross section of said interlocking member substantially is the same as the cross section of said bore.

5. The combination of claim 1 and wherein the grooves which define said bore are of the same cross section.

6. The combination of claim 1 and wherein the grooves which define said bore are respectively of different cross sections while said interlocking member is of an asymmetric cross section and substantially fills the grooves which define said bore.

7. The combination of claim 1 and wherein each side surface of said strip portions are formed with a plurality of grooves respectively defining a plurality of said bores, and a plurality of interlocking members situated in said bores.

8. The combination of claim 1 and wherein said grooves are each of a dovetail cross section, and said interlocking member having at an interface defined between engaging surfaces of successive strip portions a width smaller than the width of said interlocking member at portions thereof spaced from said interface and situated in the dovetail grooves which define said bore, so that said interlocking member interlocks said successive strip portions not only radially with respect to the axis of said inner roll body but also axially with respect thereto.

* * * * *